United States Patent Office 3,728,301
Patented Apr. 17, 1973

3,728,301
DISPERSIONS
David Hugh Spence and Arthur Topham, Manchester, England, assignors to Imperial Chemical Industries Limited, London, England
No Drawing. Filed Aug. 13, 1970, Ser. No. 63,642
Claims priority, application Great Britain, Aug. 18, 1969, 41,058/69
Int. Cl. C08g 51/02, 51/28, 51/30
U.S. Cl. 260—33.6 R    13 Claims

ABSTRACT OF THE DISCLOSURE

A composition of matter comprising a dispersion of a solid, preferably a pigment, dyestuff or textile finishing agent, in an organic solvent and a polyurea essentially free from basic amino groups which contains at least two urea groups and at least two alkyl, alkenyl or alkapolyenyl groups containing at least eight carbon atoms, said polyurea being soluble in the organic solvent, and the use of the said compositions of matter.

---

This invention relates to dispersions of solid particles in organic liquids, and more particularly to dispersions of improved stability and to dispersing agents suitable for use in the manufacture of said dispersions.

Dispersions of solids, such as pigments, in organic liquids tend to flocculate. This may occur for example during storage or, in the case of pigment dispersions to be used as paints, during evaporation of the solvent from a coating leading to loss of tinctorial strength, gloss, hiding power and homogeneity. Flocculation may also result in separation of the dispersion causing difficulty in handling the disperison.

Various procedures have been described for improving the resistance of pigment dispersions to flocculation. Thus it has been proposed to blend the pigment with a variety of basic substituted derivatives of the pigment which improve the dispersibility of the pigment. While the use of such derivatives of the pigment normally affords a dispersion of shade similar to that from the unmodified pigment the surface coatings obtained from the dispersion are often not satisfactory owing to migration of the coloured pigment derivative causing staining of adjacent materials. Further such derivatives are not suitable for the dispersion of pigments or other compounds of different colour from the pigment derivative or for the dispersion of colourless compounds. The present invention obviates these difficulties by using as dispersing agents certain urea derivatives which are in general colourless and which can be readily prepared from readily available materials.

According to the invention there is provided a dispersion of a solid in an organic solvent and a polyurea essentially free from basic amino groups which contains at least two urea groups and at least two groups each of which is an alkyl, alkenyl or alkapolyenyl group containing at least 8 carbon atoms, said polyurea being soluble in the organic solvent.

The solid may be any inorganic or organic compound which is substantially insoluble in the organic solvent at the temperature concerned and which is in finely divided form. The invention is of particular value when the solid is a pipment, dyestuff of textile finishing agent, but the invention is not limited to such solids.

As examples of organic pigments there may be mentioned azo, thioindigo, anthraquinone, anthanthrone and isodibenzanthrone pigments vat dye pigments, triphendioxazine pigments, phthalocyanine pigments for example copper phthalocyanine, its nuclear chlorinated derivatives and copper tetraphenyl or octaphenyl phthalocyanine, other heterocyclic pigments for example linear quinacridone, lakes of acid, basic and mordant dyestuffs and the other various pigments of the organic type which are enumerated in Volume 2 of "Colour Index, 2nd Edition," published jointly in 1956 by the Society of Dyers and Colourists and the American Association of Texile Chemists and Colourists, under the heading of "Pigments," and in subsequent authorised amendments thereto.

As examples of inorganic pigments there may be mentioned chrome pigments including the chromates of lead, zinc, barium and calcium and various mixtures and modifications such as are commercially available as pigments of greenish-yellow to red shades under the names primrose, lemon, middle, orange, scarlet and red chromes. Modified chrome pigments may contain for example sulphate radicals and/or additional metals such as aluminum, molybdenum and tin. Further examples of inorganic pigments are titanium dioxide, zinc oxide, Prussian blue and its mixtures with chrome yellows which are known as Brunswick Greens or chrome greens, cadmium sulphide and sulphoselenide, iron oxide, vermilion and ultramarine.

As examples of dyestuffs there may be mentioned water-insoluble dyestuffs such as disperse dyestuffs and water-soluble dyestuffs such as basic, acid and direct dyestuffs. The dyestuffs may be for example azo dyestuffs, such as monoazo and disazo dyestuffs and metallised derivatives thereof, anthraquinone, nitro, phthalocyanine, methine, styryl, naphthoperinone, quinophthalone, diarylmethane, triarylmethane, xanthine, azine, oxazine and thiazine dyestuffs. If desired the dyestuffs can be reactive dyestuffs which contain groups capable of forming covalent bonds with textile materials.

As examples of textile finishing agents there may be mentioned flame-proofing agents such as antimony trioxide, acid catalysts for textile finishing resins such as magnesium chloride and ammonium dihydrogen phosphate, and especially fluorescent brightening agents.

The organic solvent may be any organic solvent but is preferably a hydrocarbon or halogen-substituted derivative thereof. As examples of such solvents there are mentioned aromatic hydrocarbons such as benzene, toluene, xylene, aliphatic and cycloaliphatic hydrocarbons such as white spirit, cyclohexane, and halogen substituted hydrocarbons such as chlorobenzene, trichloroethylene, perchloroethylene 1,1,1-trichloroethane, methylene dichloride, chloroform, 1,1,2-trichloro-1,2,2-trifluoroethane, carbon tetrachloride, tetrachloroethane or dibromoethylene and mixtures of these compounds. Other organic solvents may however be used for example esters such as butyl acetate and heat bodied linseed oils used as lithographic varnish media and ketones such as cyclohexanone. Mixtures of such solvents may be used. The solvents may contain other materials in solution, for example the alkyd, nitrocellulose, acrylic, urea/formaldehyde, melamine/formaldehyde or other resins used in paint media or zinc/calcium rosinates used in gravure ink media.

By the term urea group is meant a group of the formula —NH—CO—NR— wherein R is a hydrogen atom or a monovalent organic group such as an alkyl, alkenyl or alkapolyenyl group, or a divalent organic group such as a phenylene, trimethylene, hexamethylene, methylene bisphenylene or tolylene groups linking the urea group to another part of the polyurea molecule. The polyurea contains two or more urea groups each of which may be the same or as different from any of the others.

As examples of alkyl, alkenyl or alkapolyenyl groups containing at least 8 carbon atoms there are mentioned hexadecyl, dodecyl, oleyl, octadecyl, octadecenyl, myristoleyl, palmitoleyl and linoleyl groups. It is preferred that none of these groups should contain more than 30 carbon atoms, and preferably these groups contain from 12 to 20 carbon atoms. Polyureas containing as fatty groups alkenyl or alkapolyenyl groups are in general more effective as dispersing agents than polyureas containing as fatty groups only alkyl groups. These unsaturated polyureas are new compositions of matter and represent a further feature of the invention.

The polyurea may be prepared from appropriate starting materials by application of known reactions, but may in many cases be especially readily obtained by the reaction of isocyanates, especially polyisocyanates, with mono- and/or polyamines containing alkyl, alkenyl or alkapolyenyl groups. Many such mono- and/or polyamines are available commercially; however such commercially available products comprise mixtures of amines which differ in respect of the length of the alkyl, alkenyl or alkapolyenyl chains and/or the degree of unsaturation. Accordingly the polyureas obtained from such amines comprise, in general, mixtures of two or more different polyureas. However such mixtures of polyureas are entirely suitable for production of the dispersions of the invention. Especially suitable polyamines are diamines of the formula $R_1$—NH—$R_2$—NH—$R_3$ wherein $R_1$ is an alkyl, alkenyl or alkapolyenyl group containing at least 8 carbon atoms, $R_2$ is a divalent organic radical, particularly ethylene or 1,3-propylene, and $R_3$ is a hydrogen atom or an alkyl, alkenyl or alkapolyenyl group.

Preferred polyureas are obtained by the use of polyisocyanates containing more than two isocyanate groups, especially polyisocyanates obtained by polymerisation of diisocyanates such as 2,4- or 2,6-tolylene-diisocyanate or mixtures of these. This preparative reaction is normally carried out in an organic solvent and when this solvent is the solvent to be used in the dispersion the solution of the polyurea so obtained may if desired be used without isolation of the polyurea.

As examples of polyureas there are mentioned the adducts tolylene di-isocyanate/octadecylamine, hexamethylene di-isocyanate/dodecylamine, and especially the more complex polyureas and those containing alkenyl or alkapolyenyl groups, e.g. tolylene di-isocyanate/oleylamine, tolylene di-isocyanate/R—NH—$(CH_2)_3$—$NH_2$ where R is a fatty group derived from tallow, tolylene di-isocyanate/R—NH—$(CH_2)_3$—$NH_2$/$R'_2NH$ where R is a fatty group derived from tallow and R' is a fatty group derived from soya, polymerised tolylene di-isocyanate/$R'_2NH$ where R' is a fatty group derived from soya, polymerised tolylene diisocyanate/$R'NH_2$ where R' is oleyl, and the adducts from oleylamine or di-soya-amine with the isocyanate ended polyurethanes from tolylene di-isocyanate and polyols.

As basic amino groups which should not be present to any significant extent in the polyurea there are meant any amino groups of sufficiently basic nature to combine readily with weak organic acids. In particular such amino groups will include primary, secondary and tertiary amino groups in which the nitrogen atom is attached only to hydrogen atoms, alkyl groups, cycloalkyl groups or substituted derivatives of these or in which the nitrogen atom is part of a basic heterocyclic ring. Amino groups which are attached directly to carbonyl or sulphonyl groups or to aryl radicals are not in general basic and may be present in the polyureas.

It is not necessary that the polyurea be absolutely free from basic amino groups since a small proportion of such groups can be tolerated. For example in the polymeric ureas obtained from diisocyanates and diamines the presence of a small proportion of unreacted amino groups would not detract significantly from the performance of the polyurea.

To be effective a polyurea must dissolve in the organic solvent. It is however, possible to use mixtures of polyureas, for example of polymeric ureas, some of the components of which are not soluble or not completely soluble in the amount and type of solvent used, as long as an adequate amount of polyurea does dissolve in the organic solvent to produce the desired effect and any undissolved polyurea can be tolerated in the application for which the dispersion is intended.

The above polyureas are essentially colourless but if desired chromophoric residues can be incorporated into the polyurea molecule by any suitable conventional method.

The dispersion may be made by any conventional or well known procedure. For example the solid, solvent and polyurea or mixture of polyureas may be mixed in any order and the mixture then subjected to treatment to reduce the particle size of the solid, for example ball milling or gravel milling until the dispersion is formed.

Reduction of the particle size to less than about 25 microns and preferably less than 10 microns, will generally be sufficient to permit the dispersion to form. By particle size is meant that in a diluted sample of the dispersion observed with a microscope the majority of the particles should have an equivalent circle diameter below the stated limit.

Alternatively the solid can be treated to reduce its particle size independently or in admixture with one or other of the solvent or polyurea and the other ingredient or ingredients then added, following which dispersion will take place on stirring. The readily dispersible compositions obtained in this way and comprising a solid in fine particle size and a polyurea are a further feature of the invention.

The dispersion may also be obtained by flushing the solid from an aqueous suspension or filter cake into the organic solvent, either in the presence of the polyurea or with subsequent addition of the polyurea.

It is preferred that the amount of polyurea present in the dispersions is such as corresponds to between 5 and 50% by weight based on the weight of the solid present in the dispersion, and the dispersions preferably contain from 5 to 50% by weight of the solid based on the total weight of the dispersion.

The polyureas may be used alone or in conjunction with other dispersing agents to form dispersions of solids in organic solvents. Especially suitable other dispersing agents, which in some cases show some synergism in dispersant effect with the polyureas, are the agents of British Pat. No. 1,108,261.

Without prejudice to the scope of the invention it is believed that the polyureas act by being adsorbed from solution in the organic solvent on the surface of the particles of the solid to form a surface layer which prevents or hinders the particles from adhering to each other. It is preferable to choose an organic solvent which, whilst being strong enough to dissolve the polyurea, interferes as little as possible with the adsorption of the polyurea on the surface of the particles of the solid. The chemical natures of the solid, the organic solvent and the polyurea will all influence this adsorption.

The dispersions of the invention provide liquid compositions containing the solid in a finely divided deflocculated condition and may be used for any purpose for which dispersions are conventionally used. They are of especial value for applications in which solutions would not give the desired effect or in those circumstances in which no organic solvent possesses the required combination of solvent action on the solid and other properties.

The dispersions are of particular value in the manufacture of paints for which purpose conventional alkyd or other resins and other materials used in paint media are added to the dispersion or incorporated into the dispersion while it is being formed. Since the dispersions are, in contrast to the dispersions hitherto available, stable in the absence of the paint media, the dispersions may conveniently be manufactured and stored as such and then mixed as required with the particular paint media which it is desired to use. The dispersions are also of value in the manufacture of printing inks.

The invention is illustrated but not limited by the following examples in which all parts and percentages are by weight unless otherwise stated.

EXAMPLE 1

A solution of 41.4 parts of an 80:20 mixture of 2,4- and 2,6-tolylene diisocyanates in 79 parts of acetone is gradually added with stirring to a solution of 150 parts of a mixture of unsaturated amines, largely oleylamine, commercially available under the trade name Armeen O (Armeen is a Registered Trademark) in 484 parts of acetone. There is a mildly exothermic reaction after which the acetone is distilled off, finally, at 100° C. under a pressure of 20 mm. of mercury to leave a residue of the desired polyurea as a plastic mass, soluble in toluene to give a visco-elastic solution. The presence in the infra-red absorption spectrum of bands at 3310 and 1250 cm.$^{-1}$, show that the polyurea has been formed.

EXAMPLE 2

A solution of 20.3 parts of a mixture of unsaturated fatty secondary amines of average molecular weight 530 commercially available under the trade name Armeen 2S and 1.8 parts of 68.3% ethylene diamine in 79 parts of acetone is stirred at 50° C. whilst 6.6 parts of an 80:20 mitxure of 2,4- and 2,6-tolylene di-isocyanates in 7.9 parts of acetone are gradually added. The acetone is then distilled off, finally at 100° C. under reduced pressure, leaving the desired polyurea as a plastic mass.

EXAMPLE 3

A solution of 13.5 parts of octadecylamine in 79 parts of acetone is stirred at 53° C. whilst 4.14 parts of mixed tolylene diisocyanates in 7.9 parts of acetone are gradually added. The solvent is distilled off, finally at 70° C. under reduced pressure, to leave the desired polyurea as a molten mass which sets to a wax on cooling, readily soluble in toluene.

EXAMPLE 4

A solution of 37.2 parts of a fatty diamine of the formula R—NH—(CH$_2$)$_3$—NH$_2$ wherein R is a fatty radical derived from tallow, commercially available under the trade name Duomeen T (Duomeen is a Registered Trademark) in 158 parts of acetone is stirred at 48° C. whilst 17.4 parts of mixed tolylene diisocyanates in 39.5 parts of acetone are gradually added. The acetone is distilled off, finally at 100° C. under reduced pressure. The resulting pale amber coloured resin is readily soluble in aromatic solvents such as toluene or xylene, but practically insoluble in more aliphatic solvents such as white spirit. The infra-red spectrum shows that there is no unreacted isocyanate left, and the absorption bands at 3370, 1630 1540, 1310 and 1225 cm.$^{-1}$, close to peaks in the spectra of 1-phenyl-3-alkyl ureas, confirm that the polyurea has been formed.

EXAMPLE 5

A solution of 150 parts of Armeen O in 395 parts of acetone is stirred whilst 40 parts of hexamethylene diisocyanate in 79 parts of acetone are gradually added. The acetone is distilled off, finally at 100° C. under reduced pressure to leave the desired polyurea as a pale yellow solid. The infra-red spectrum shows bands at 3330, 1620, 1580 and 1250 cm.$^{-1}$ corresponding closely to those in the spectra of 1,3-dialkylureas, confirming that the expected polyurea has been formed.

EXAMPLE 6

A solution of 31.5 parts of Armeen O in 87 parts of acetone is stirred whilst 37.5 parts of a commercially available 50% solution in ethylacetate of polymerized mixed tolylenediisocyanates of a low degree of polymerization containing 8.5% of free tolylene di-isocyanate and 11.2% of NCO groups, in 15.8 parts of acetone are added. The acetone is distilled off, finally at 100° C. under reduced pressure, leaving the desired polyurea as a pale yellow resin. The infra-red spectrum shows bands at 3360, 1635, 1540 and 1510 cm.$^{-1}$ consistent with polyurea formation.

EXAMPLE 7

A solution of 53.5 parts of Armeen 2S in 118 parts of acetone is stirred at 50–55° C. whilst 73.7 parts of a commercially available 40% solution in butyl acetate of polymerized mixed tolylenediisocyanates containing 5.7% of NCO groups and less than 0.5% of free tolylene diisocyanate in 32 parts of acetone are gradually added. The acetone is removed by distillation leaving the required polyurea as a pale yellow gum. The infra-red spectrum shows that isocyanate groups are now absent. The absence of bands at 1100 to 1150 cm.$^{-1}$ shows that the NH groups have reacted. Bands at 1720 and 1410 cm.$^{-1}$ are due to isocyanurate rings. New bands at 1645, 1530 and 1490 cm.$^{-1}$ are close to bands in the spectrum of 1,1-dimethyl-3-phenylurea, showing that the expected urea has been formed.

EXAMPLE 8

The procedure of Example 7 is repeated but using as polyisocyanate 29.8 parts of a commercially available 75% solution in ethylacetate of an adduct from mixed tolylenediisocyanates and polyols and containing 14.1% of residual isocyanate groups in 16 parts of acetone. The product is a pale yellow gum. The infra-red spectrum shows a band near 1720 cm.$^{-1}$ due to ester groups. Bands at 1640, 1530 and 1495 cm.$^{-1}$ confirm that the expected urea has been formed.

EXAMPLE 9

A solution of 50.8 parts of Armeen 2S and 18.6 parts of Duomeen T in 197 parts of acetone is stirred at 50–55° C. whilst 17.4 parts of mixed tolylene diisocyanates in 19.7 parts of acetone are gradually added. The acetone is removed by distillation, finally at 60° C. under reduced pressure, leaving the desired polyurea as a viscous gum. The infra-red spectrum shows bands at 1630, 1520 and 1490 cm.$^{-1}$ confirming the presence of urea groups.

EXAMPLE 10

A solution of 50.8 parts Armeen 2S and 18.6 parts of Duomeen T in 100 parts of white spirit is stirred at 50–55° C. whilst 17.4 parts of mixed tolylene diisocyanates in 19.2 parts of white spirit are gradually added. On cooling a clear solution remains containing 42.1% of the desired polyurea, confirmed by the presence of bands at 1630, 1520 and 1490 cm.$^{-1}$, in the infra-red spectrum.

EXAMPLE 11

A mixture of 10 parts of Colour Index Pigment Green No 7, 5 parts of the polyurea prepared in Example 1 and 86 parts of toluene is ball milled for 16 hours to give a finely divided well deflocculated dispersion. The solvent is allowed to evaporate at 20° C. leaving a solid which is auto-dispersible in toluene regenerating the finely divided well-deflocculated dispersion.

EXAMPLE 12

A mixture of 10 parts of Colour Index Pigment Green No. 7, 5 parts of the polyurea prepared in Example 2 and 87 parts of xylene (the commercially available mixture of isomers) is ball-milled for 16 hours. It gives a finely divided well-deflocculated dispersion. A similar result is obtained using the polyureas prepared as described in Examples 3, 4, 5, 6, 7, and 8.

EXAMPLE 13

A mixture of 10 parts of Colour Index Pigment Yellow No. 13, 5 parts of the polyurea prepared as described in Example 7 and 87 parts of xylene is ball-milled for 16 hours. It gives a finely divided well-deflocculated dispersion. A similar result is obtained using the polyurea prepared as described in Example 8.

EXAMPLE 14

A mixture of 10 parts of Colour Index Pigment Red No. 57, 5 parts of the polyurea prepared as described in Example 1 and 77 parts of white spirit is ball-milled for 16 hours. It gives a finely divided well-deflocculated dispersion. Similar results are obtained using Colour Index Pigment Red No. 3, Monastral Fast Blue FBS (a treated α-form partially chlorinated copper phthalocyanine) (Monastral is a Registered Trademark), Colour Index Pigment Yellow No. 34 and Tioxide RCR (a coated form of rutile titanium dioxide).

EXAMPLE 15

53 parts of Monastral Fast Blue LBX (the α-form of partially chlorinated copper phthalocyanine Colour Index Pigment Blue No. 15) press paste (containing 16 parts of dry pigment) are mixed with 60 parts of toluene in which 8 parts of the product described in Example 1 have been dissolved and agitated until all the pigment transfers to the solvent phase. The pigmented solvent phase is separated from the clear aqueous phase and the solvent removed by evaporation at 70° C., yielding a pigment composition which readily redisperses into toluene giving a finely divided deflocculated pigment suspension in the toluene.

9 parts of this pigment composition, are mixed with 51 parts of toluene by high speed stirring and the fine dispersion so obtained is mixed with 260 parts of a conventional white paint, e.g. a long oil alkyd resin dissolved in white spirit, and pigmented with titanium dioxide, giving a blue paint of higher tinctorial strength than a paint made in the same way but omitting the product described in Example 1.

EXAMPLE 16

100 parts of Colour Index Pigment Green No. 7 are mixed with 60 parts of the polymer as described in Example 1 to form a very viscous plastic mass which is milled in a heavy duty internal mixer (such as a Bekens Duplex mixer) at 80–100° C. for 7 hours when a fine dispersion of the pigment is obtained. On cooling the mixture a solid is obtained which readily disperses into toluene, cyclohexane or white spirit by high speed stirring giving a deflocculated fine dispersion of the green pigment which can be added directly to a long oil alkyd based paint or varnish to give a green paint or varnish.

EXAMPLE 17

A mixture of 10 parts of Colour Index Disperse Blue 83, 5 parts of the polyurea product described in Example 1 and 163 parts perchlorethylene is ball milled for 16 hours to give a finely divided deflocculated dispersion.

A similar result is obtained using Colour Index Disperse Red 131 instead of Colour Index Disperse Blue 83.

EXAMPLE 18

A mixture of 10 parts of Colour Index Disperse Blue 26, 5 parts of the polyurea product described in Example 4 and 163 parts of perchlorethylene is ball milled for 16 hours to give a finely divided well deflocculated dispersion.

Similar results are obtained using Colour Index Disperse Brown 4 or 4,8-diaminoanthrarufin instead of Colour Index Disperse Blue 26.

EXAMPLE 19

A mixture of 10 parts of Colour Index Disperse Blue 3, 5 parts of the polyurea product described in Example 7 and 163 parts of perchlorethylene is ball milled for 16 hours to give a well deflocculated dispersion.

Similar results are obtained using Colour Index Disperse Blue 7 or Colour Index Disperse Violet 8 or 4,8-diaminoanthrarufin instead of Colour Index Disperse Blue 3.

EXAMPLE 20

A mixture of 10 parts of Colour Index Disperse Orange 60, 1 part of the polyurea product described in Example 8 and 163 parts of perchlorethylene is ball milled for 16 hours to give a finely divided well deflocculated dispersion.

A similar result is obtained using Colour Index Disperse Yellow 1 instead of Colour Index Disperse Orange 60.

EXAMPLE 21

A mixture of 10 parts of Colour Index Disperse Yellow 1, 1 part of the product described in Example 7 and 163 parts of perchlorethylene is ball milled for 16 hours to give a finely divided well deflocculated dispersion.

EXAMPLE 22

A mixture of 10 parts of Colour Index Reactive Red 1, 5 parts of the polyurea product described in Example 8 and 163 parts of perchlorethylene is ball milled for 16 hours to give a finely divided well deflocculated dispersion.

Similar results are obtained using Colour Index Reactive Yellow 5 or sodium bicarbonate or sodium carbonate or sodium hydroxide instead of Colour Index Reactive Red 1.

EXAMPLE 23

A mixture of 10 parts of Colour Index Disperse Violet 8, 5 parts of the polyurea product described in Example 7 and 77 parts of white spirit is ball milled for 16 hours to give a finely divided well deflocculated dispersion.

EXAMPLE 24

A mixture of 10 parts of the sodium salt of 1-amino-4-anilino anthraquinone-2-sulphonic acid, 5 parts of the polyurea product described in Example 8 and 163 parts of perchlorethylene is ball milled for 16 hours to give a finely divided well deflocculated dispersion.

Replacement of the sodium salt used above by the free acid similarly affords a finely divided well deflocculated dispersion.

EXAMPLE 25

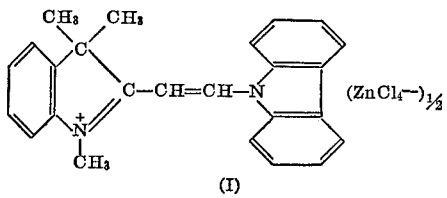

A mixture of 10 parts of the dyestuff of Formula I, 5 parts of the polyurea product described in Example 8 and 163 parts of perchlorethylene is ball milled for 16 hours to give a finely divided deflocculated dispersion.

EXAMPLE 26

A mixture of 20 parts of 4,4'-bis-(4-β-hydroxyethylamino - 6 - phenylamino-s-triazin-2-ylamino)stilbene-2,2'-disulphonic acid disodium salt, 1 part of the polymeric product prepared as described in Example 8 and 79 parts of perchlorethylene is ball-milled for 16 hours to give a finely divided well deflocculated dispersion.

EXAMPLE 27

A mixture of 10 parts of Colour Index Pigment Red No. 3, 2.5 parts of the polyurea prepared as described in Example 9, 2.5 parts of a polymeric agent prepared as described in Example 9 of specification No. 1,108,261 but using p-aminobenzoic acid instead of p-nitrobenzoic acid, and 77 parts of white spirit is ball milled for 16 hours. It gives a finely divided well deflocculated dispersion.

EXAMPLE 28

To 100 parts of white spirit in an internal mixer are added 500 parts of an aqueous press paste containing 100 parts of Colour Index Pigment Red No. 3. Mixing is continued until the pigment flushes into the white spirit and a colourless aqueous layer separates which is then removed. To the remaining pigment paste is then added 34.5 parts of a 40% solution of the polymeric agent described in Example 9 of specification No. 1,108,261 but using p-aminobenzoic acid, instead of p-nitrobenzoic acid, and 8.9 parts of a 42.1% solution of a polyurea prepared as described in Example 10. It gives a fluid finely divided well deflocculated dispersion.

EXAMPLE 29

In place of the 10 parts of C.I. Disperse Blue 3 used in Example 19 there are used 10 parts of quinol or 10 parts of urea or 10 parts of C.I. Pigment Green No. 7 when similar well deflocculated dispersions are obtained.

EXAMPLE 30

A mixture of 10 parts of C.I. Pigment Green No. 7, 5 parts of the polyurea obtained as described below and 86 parts of toluene is ball milled for 16 hours to give a finely divided well deflocculated dispersion.

The polyurea used in this example was obtained by the method described in Example 1, except that the 150 parts of Armeen O used in that example were replaced by 170 parts of a primary amine derived from rapeseed oil and consisting largely of a mixture of $C_{20}$ and $C_{22}$ amines.

EXAMPLE 31

A solution of 7.8 parts of an 80:20 mixture of 2:4- and 2:6-tolylene diisocyanates in 39.5 parts of acetone is gradually added with stirring to a solution of 40 parts of a mixture of secondary amines, of which 50% is derived from laurylamine ($C_{12}$) and the remainder is derived from other amines containing from 6 to 18 carbon atoms, commercially available under the trade name Armeen ZC, in 39.5 parts of acetone at 40° C. to 45° C. After stirring for 30 minutes at this temperature, the acetone is removed under pressure leaving a residue of the polyurea.

A mixture of 5 parts of the polyurea, 10 parts of C.I. Pigment Green No. 7 and 86 parts of toluene is ball milled for 16 hours to give a finely divided well deflocculated dispersion.

EXAMPLE 32

A solution of 2.4 parts of an 80:20 mixture of 2:4- and 2:6-tolylene diisocyanates in 8.7 parts of toluene is gradually added with stirring to a solution of 10.3 parts of the reaction product of Duomeen T and cetyl bromide (obtained as described below) in 26 parts of toluene. At the conclusion of the exothermic reaction the toluene is removed at 100° C. under reduced pressure leaving the polyurea in the form of a glassy solid.

The reaction product of Duomeen T and cetyl bromide was obtained by stirring a mixture of 55 parts of Duomeen T and 45 parts of cetyl bromide for 6½ hours at 130° C. The mixture was cooled, dissolved in a mixture of 79 parts of methanol and 93 parts of β-ethoxyethanol and added to a solution of 8 parts of sodium hydroxide in 219 parts of water. The solid was filtered off, washed with water and dried. The solid was dissolved in a mixture of 475 parts of methanol and 258 parts of a petroleum ether boiling within the range of 40° C. to 80° C., the upper liquid layer was separated off, and the solvent removed at 100° C. under reduced pressure. The yield of product was 73.3 parts and consisted largely of a di-secondary amine of the formula

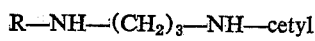

R—NH—(CH$_2$)$_3$—NH—cetyl where R is a fatty radical derived from tallow.

A mixture of 5 parts of the polyurea, 10 parts of C.I. Pigment Yellow No. 13 and 86 parts of toluene is ball milled for 16 hours to give a finely divided well deflocculated dispersion.

EXAMPLE 33

A mixture of 5 parts of the polyurea of Example 7, 10 parts of titanium dioxide and 80 parts of white spirit is ball milled for 16 hours to give a finely divided well deflocculated dispersion.

A similar good dispersion is obtained using lead chromate in place of the titanium dioxide.

EXAMPLE 34

A mixture of 30 parts of magnesium chloride hexahydrate, 15.8 parts of the 19% solution of the polyurea prepared as described below and 155 parts of perchloroethylene is ball milled for 16 hours to give a well deflocculated dispersion in which the bulk of the dispersed solid is in the form of particles less than 3 microns in size.

The solution of polyurea used above was obtained by stirring a solution of 53.5 parts of Armeen 2S in 244 parts of perchloroethylene at 50° C. whilst a mixture of 65 parts of perchloroethylene and 73.7 parts of a commercially available 40% solution in butyl acetate of polymerised mixed tolylene diisocyanates containing 5.7% of isocyanate groups and less than 0.5% of free tolylene diisocyanate, is gradually added.

What we claim is:

1. A composition of matter comprising a dispersion of a finely divided solid having a particle size of less than about 25 microns in an organic solvent selected from the group consisting of a hydrocarbon, halogen-substituted derivatives of said hydrocarbon and mixture thereof containing dissolved therein a polyurea essentially free from basic amino groups and which contains at least two urea groups and at least two groups each of which is in an alkyl, alkenyl or alkapolyenyl group containing at least 8 carbon atoms, the amount of the polyurea corresponding to between 5 and 50% by weight based on the weight of the solid, and the amount of the solid corresponding to between 5 and 50% by weight based on the total weight of the dispersion.

2. A composition of matter as claimed in claim 1 wherein the solid is an organic pigment.

3. A composition of matter as claimed in claim 1 wherein the solid is an inorganic pigment.

4. A composition of matter as claimed in claim 1 wherein the solid is a dyestuff.

5. A composition of matter as claimed in claim 4 wherein the dyestuff is a disperse dyestuff.

6. A composition of matter as claimed in claim 4 wherein the dyestuff is a water-soluble dyestuff.

7. A composition of matter as claimed in claim 4 wherein the dyestuff is a reactive dyestuff.

8. A composition of matter as claimed in claim 1 wherein the solid is a textile finishing agent.

9. A composition of matter as claimed in claim 1 wherein the alkyl, alkenyl or alkapolyenyl groups present in the polyurea contain from 12 to 20 carbon atoms.

10. A composition of matter as claimed in claim 1 wherein the polyurea is a condensation product of an isocyanate with a mono- or polyamine containing the said alkyl, alkenyl or alkapolyenyl groups.

11. A composition of matter as claimed in claim 1 wherein the polyurea is a condensation product of 2:4- or 2:6-tolylene diisocyanate or a mixture thereof with a mono- or polyamine containing the said alkyl, alkenyl or alkapolyenyl groups.

12. A composition of matter as claimed in claim 10 wherein the polyurea has been obtained from a mixture of the said amines.

13. A composition of matter as claimed in claim 1 wherein the polyurea is a condensation product selected from the group consisting of tolylene di-isocyanate/octadecylamine, hexamethylene di-isocyanate/dodecylamine, tolylene di-isocyanate/oleylamine, tolylene di-isocyanate/R—NH—(CH$_2$)$_3$—NH$_2$ where R is a fatty group derived from tallow, tolylene di-isocyanate/

R—NH(CH$_2$)$_3$—NH$_2$/R′2NH where R is a fatty group derived from tallow and R′ is a fatty group derived from soya, polymerized tolylene di-isocyanate/R′NH$_2$ where R′ is oleyl, and the adducts from oleylamine or di-soya-amine with the isocyanate ended polyurethane from tolylene di-isocyanate and polyols.

References Cited

UNITED STATES PATENTS

| | | | |
|---|---|---|---|
| 3,148,173 | 9/1964 | Axelrod | 260—37 N |
| 3,549,396 | 12/1970 | Dietz | 106—308 N |
| 3,560,235 | 2/1971 | Sarfas et al. | 106—308 N |

OTHER REFERENCES

Chemical Abstracts, vol. 60, 4869f, 1964.

ALLAN LIEBERMAN, Primary Examiner

U.S. Cl. X.R.

260—33.6 UB, 33.8 R, 33.8 UB, 37 N; 106—308 N, 316